(12) United States Patent
Iwai et al.

(10) Patent No.: US 7,516,824 B2
(45) Date of Patent: Apr. 14, 2009

(54) BICYCLE DISK BRAKE PAD

(75) Inventors: Toru Iwai, Osaka (JP); Takashi Fujitani, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 12/013,497

(22) Filed: Jan. 14, 2008

(65) Prior Publication Data
US 2008/0230332 A1    Sep. 25, 2008

(30) Foreign Application Priority Data
Mar. 19, 2007   (JP) .............................. 2007-070249

(51) Int. Cl.
F16D 65/40      (2006.01)
(52) U.S. Cl. ................. 188/250 B; 188/251 M
(58) Field of Classification Search ............ 188/251 A, 188/251 M, 251 R, 250 B
See application file for complete search history.

(56) References Cited

U.S. PATENT DOCUMENTS

| | | | | |
|---|---|---|---|---|
| 3,948,364 A * | 4/1976 | Lowey | ................... | 188/251 R |
| 4,311,524 A * | 1/1982 | Genkin et al. | ................. | 75/231 |
| 4,438,004 A * | 3/1984 | Myers | ........................ | 428/550 |
| 4,456,578 A * | 6/1984 | Ward | .............................. | 419/8 |
| 5,617,935 A * | 4/1997 | Chuang et al. | ............. | 188/73.1 |
| 5,841,042 A * | 11/1998 | Kato | ........................... | 75/231 |
| 5,894,010 A * | 4/1999 | Porkert et al. | ................. | 420/15 |
| 2001/0052373 A1* | 12/2001 | Kanaoka | .................... | 148/320 |

FOREIGN PATENT DOCUMENTS

| | | |
|---|---|---|
| DE | 42 23 417 A1 | 1/1994 |
| GB | 2 030 665 A | 4/1980 |
| JP | 05-215163 A | 8/1993 |
| JP | 08-188769 A | 7/1996 |
| JP | 2002-054668 A | 2/2002 |

* cited by examiner

*Primary Examiner*—Christopher P Schwartz
(74) *Attorney, Agent, or Firm*—Global IP Counselors, LLP

(57) ABSTRACT

A bicycle disk brake pad basically comprises a backplate part and a friction part. The backplate part is made of a copper-based sintering alloy. The friction part is made of a copper-based sintering alloy that is integrally sintered with the backplate part.

6 Claims, 4 Drawing Sheets

BICYCLE DISK BRAKE PAD

CROSS-REFERENCE TO RELATED APPLICATIONS

This application claims priority under 35 U.S.C. § 119 to Japanese Patent Application No. 2007-070249 on Mar. 19, 2007. The entire disclosure of Japanese Patent Application No. 2007-070249 is hereby incorporated herein by reference.

BACKGROUND OF THE INVENTION

1. Field of the Invention

The present invention generally relates to a brake pad. More specifically, present invention relates to a disk brake pad of a disk brake apparatus used for a bicycle.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One component that has been extensively redesigned is the bicycle braking system.

Disk brake pads generally grip a disk brake rotor that rotates with a wheel for stopping rotation of the wheel. Conventionally known disk brake pads of this type have a dry friction member made of a sintered copper metal and a backplate made of a stainless steel alloy or other steel to which the friction member is joined (for example, see Japanese Laid-Open Patent Application No. 08-188769). In conventional disk brake pads that have a friction member made of such a sintered metal, the friction member is manufactured by diffusion bonding, whereby the sintered metal is baked and simultaneously joined to the backplate. Specifically, a copper plating is formed on the bonding surface of the backplate, a molded metallic compact that will become the friction member is placed on the copper plating layer, and the compact that will become the friction member is joined to the backplate by being baked using a hot press at a high temperature of, e.g., 900° C. For brake pads manufactured in this manner, the bonding of the friction member to the copper plating layer is performed using chemical bonding, with the backplate and the copper plating layer being metallically bonded.

In a conventional configuration in which the friction member is bonded on the copper plating layer through diffusion bonding, the copper plating layer that is chemically bonded to the friction member is first formed on the backplate, and then the friction member is subsequently sintered thereon. It accordingly becomes necessary to have a pretreatment step for forming the copper plating layer on the backplate surface, and to have equipment for applying pressure during the heat treatment and for performing diffusion bonding. The manufacturing steps become complicated.

Diffusion bonding requires a high temperature of 850° or higher. The baking temperature rises during sintering, and the hardness of the friction member increases, so that noises may be produced during braking.

In view of the above, it will be apparent to those skilled in the art from this disclosure that there exists a need for an improved bicycle disk brake pad. This invention addresses this need in the art as well as other needs, which will become apparent to those skilled in the art from this disclosure.

SUMMARY OF THE INVENTION

One object of the present invention is to provide a disk brake pad for a bicycle, whereby braking noise can be minimized and manufacture can be readily performed.

According to a first aspect, a bicycle disk brake pad is provided that basically comprises a backplate part and a friction part. The backplate part is made of a copper-based sintering alloy. The friction part is made of a copper-based sintering alloy that is integrally sintered with the backplate part.

In the bicycle disk brake pad, the backplate part is integrally molded and sintered with the friction part using a copper-based sintering alloy, which is conventionally used only for the friction part. Therefore, in comparison with the conventional process wherein the copper plating layer that is chemically bonded to the friction member is formed on the backplate, and the friction member is sintered thereon, a pre-treatment step for forming the copper plating layer and a step for applying pressure during heat treatment and performing diffusion bonding are unnecessary. Moreover, the friction part does not need to be joined to the backplate. Therefore, it is possible to manufacture the backplate including the friction part at a temperature lower than the temperature required for joining. As a result, the hardness of the friction part can be lowered and braking noises can be suppressed, while the steps for manufacturing the disk brake pad for a bicycle can be simplified and manufacturing can be readily performed.

According to a second aspect, the bicycle disk brake pad according to the first aspect is further configured such that the backplate part and the friction part are sintered together as a single body with the backplate part and the friction part containing copper and tin. In this case, the tin is added to the copper, whereby the strength of the backplate and the heat resistance and abrasion resistance of the friction part can be maintained.

According to a third aspect, the bicycle disk brake pad according to the first or second aspect is further configured such that the backplate part includes a copper content of about 89%, a tin content of about 9%, an iron content of 1%, and a chromium content of about 1%, with all percentage by weight According to the present invention, in comparison with the conventional process in which the copper plating layer formed on the backplate is chemically bonded to the friction member, and the friction member is sintered thereon. Thus, a pre-treatment step for forming the copper plating layer and a step for applying pressure during heat treatment and performing diffusion bonding are unnecessary. Moreover, the friction part does not need to be joined to the backplate; therefore, it is possible to manufacture the backplate including the friction part at a temperature lower than the temperature required for joining. As a result, the hardness of the friction part can be lowered and braking noises can be suppressed, while the steps for manufacturing the disk brake pad for a bicycle can be simplified and manufacturing can be readily performed.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
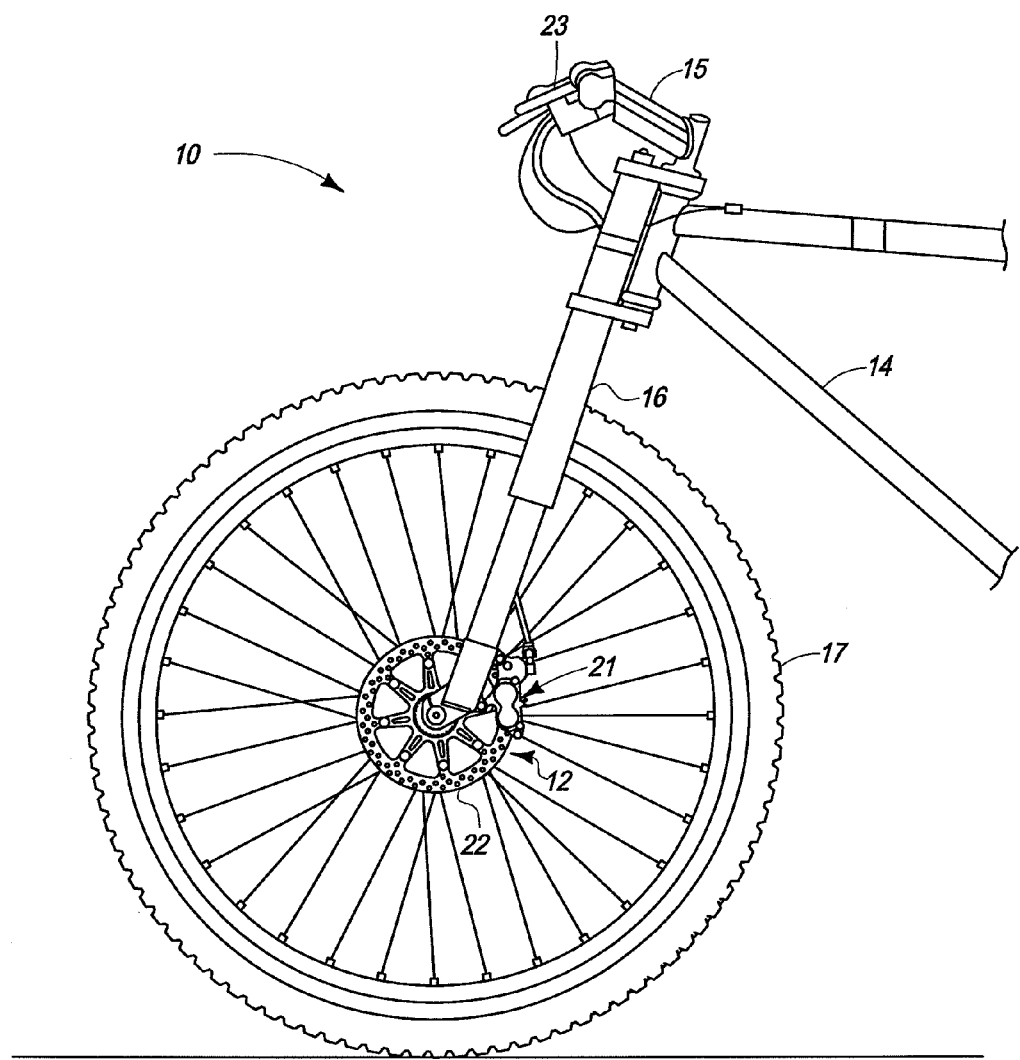
FIG. 1 is a side elevational view of a front portion of a bicycle in which a brake caliper uses a pair of bicycle disk brake pads in accordance with one embodiment.

FIG. 1 shows a front portion of a bicycle 10 having a disk brake apparatus 12 according to one illustrated embodiment. The bicycles 10 of this type are well-known in the art, and detailed descriptions of the bicycle components have been omitted. The bicycle 10 basically includes a bicycle frame 14 having a handlebar 15, a pair of forks 16 (only the front fork is shown), a pair of wheels 17 (only the front wheel is shown), and a drive device having a sprocket and a chain.

The disk brake apparatus 12 basically includes a brake caliper 21, a disk rotor 22 and a brake actuating mechanism 23. The brake caliper 21 is installed on a front fork 16 to which is attached a double crown suspension.

Figure 2:
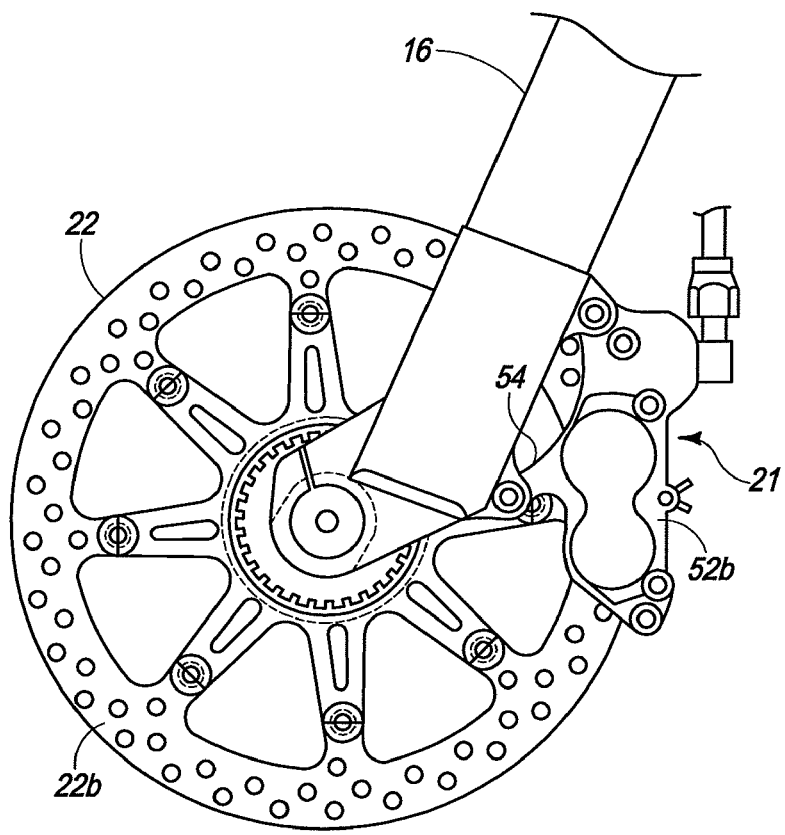
FIG. 2 is an enlarged side elevational view of a disk rotor part of the bicycle of the illustrated embodiment.
Figure 3:
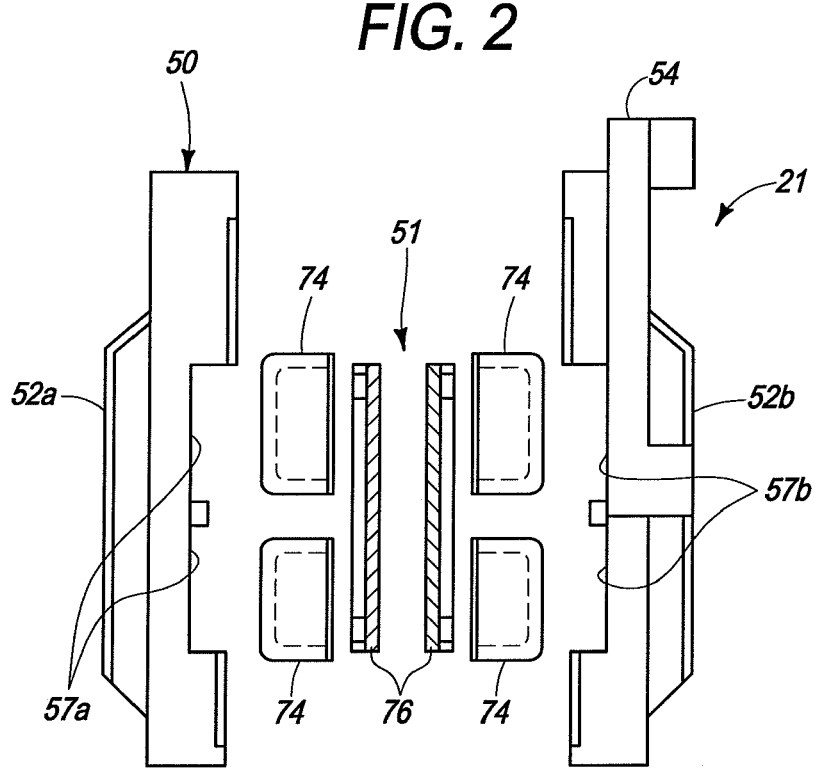
FIG. 3 is an exploded perspective view of the brake caliper of the illustrated embodiment.

The brake caliper 21 is attached to the front fork 16 of the bicycle 10 in a position adjacent to the disk rotor 22, and is capable of applying a gripping force to the disk rotor 22 for stopping the rotation thereof. As shown in FIGS. 2 and 3, the brake caliper 21 basically includes a housing 50 and a piston unit 51. The housing 50 is made of a heat conducting material such as an aluminum alloy. The housing 50 basically includes a first housing member 52a and a second housing member 52b that are bolted together. Both housing members 52a and 52b are of substantially the same shape. A hydraulic pipeline 86 of the brake actuating mechanism 23 is connected to the second housing member 52b, and brake oil is supplied to both housing members 52a and 52b.

Figure 5:
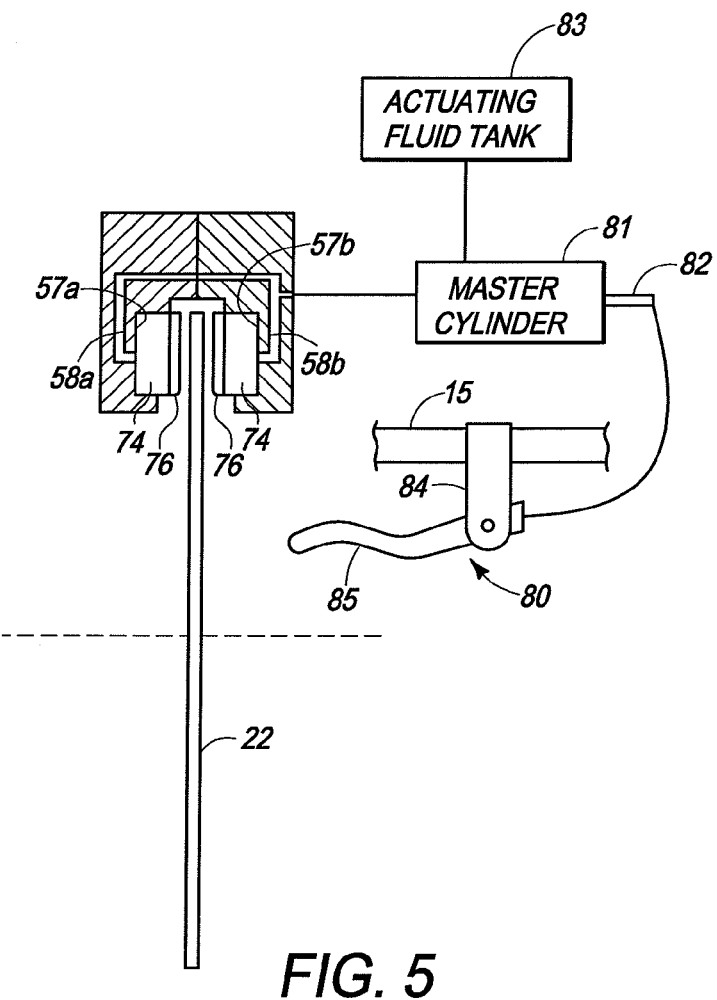
FIG. 5 is a simplified structural diagram of a disk brake apparatus of the illustrated embodiment.

The second housing member 52b comprises an outwardly extending flange that forms an attachment member 54 for bolting the brake caliper 21 to the front fork 16. When both housing members 52a and 52b are bolted together, a brake slot is formed therebetween, and the disk rotor 22 can be stored therebetween. As shown in FIGS. 3 and 5, the housing member 52a has a pair of round cylinder recesses 57a, while the housing member 52b has a pair of round cylinder recesses 57b. Each of recesses 57a and 57b a houses a piston 74. The housing member 52a has an oil channel 58a for supplying brake oil to each of the round cylinder recesses 57a. The housing member 52b has an oil channel 58b for supplying brake oil to each of the round cylinder recesses 57b. As a result, the brake oil supplied from the brake actuating mechanism 23 is made to flow into the second housing member 52b, and then through the oil passages 58a and 58b for moving the piston unit 51.

As shown in FIG. 3, the piston unit 51 comprises four pistons 74 and a pair of brake pads 76. The pistons 74 are slidably fitted into the cylinder recesses 57a and 57b, and move between a non-braking position and a braking position. The brake pads 76 are positioned on the distal ends of the pistons 74 and move integrally therewith. Therefore, when the pistons 74 move from the brake release position to the braking position, the brake pads 76 also move from the brake release position to the braking position. When in the braking position, the brake pads 76 grip the disk rotor, frictionally engage therewith, and brakes the front wheel 17 via the disk rotor 22. When in the non-braking position, the disk brake pads 76 separate from the disk rotor 22, which is then able to rotate freely.

Figure 6:
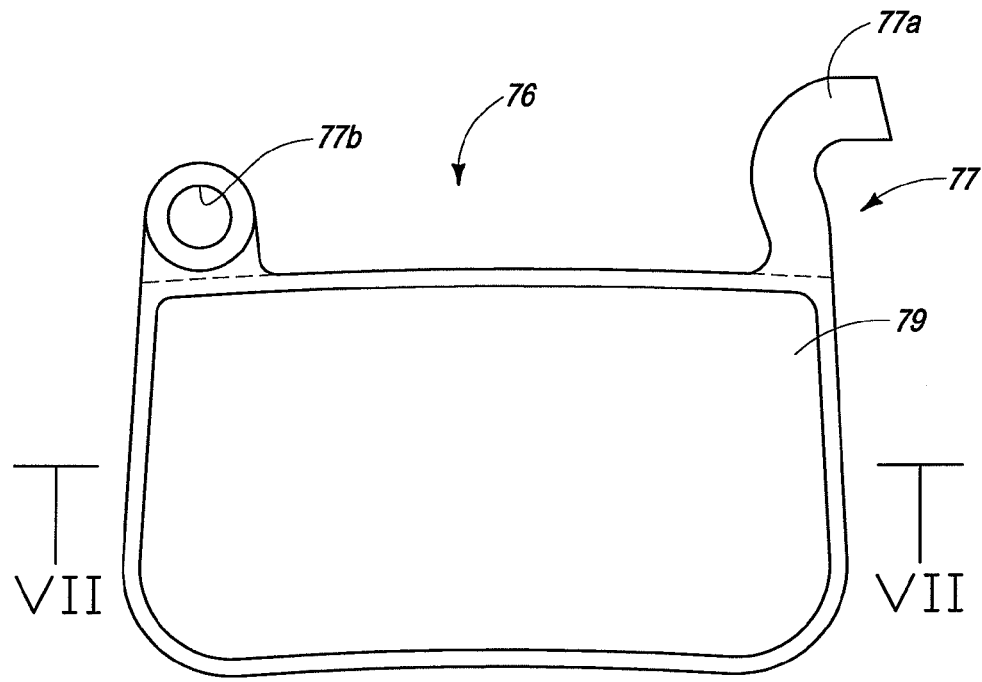
FIG. 6 is a side elevational view of the disk brake pad according to the illustrated embodiment.
Figure 7:
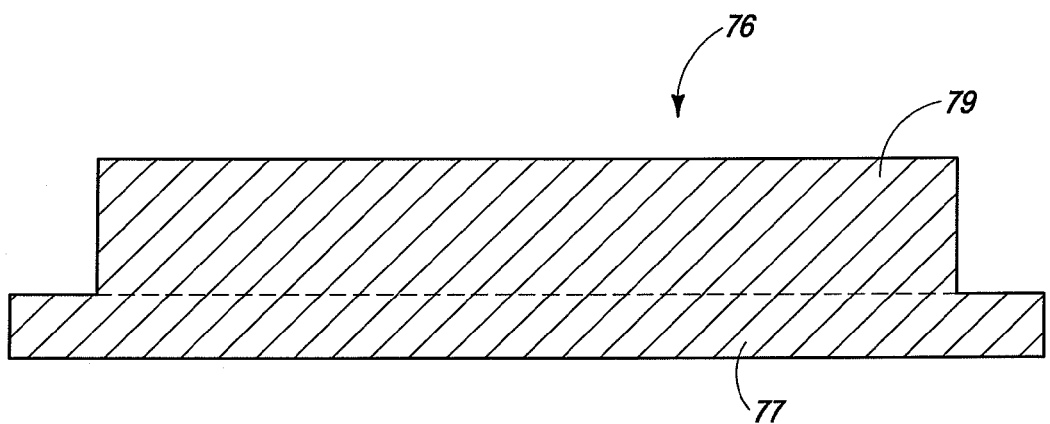
FIG. 7 is a cross-sectional schematic view across 7-7 in FIG. 6 of the illustrated embodiment.

Each of the brake pads 76 basically includes a backplate part 77 and a friction part 79. The brake pads 76 are preferably sintered pads that are entirely composed of a sintering alloy. The friction part 79 is formed as part of the backplate part 77, as shown in FIGS. 6 and 7.

The backplate part 77 is a component in the form of a plate and made of a copper-based sintering alloy having a thickness of, e.g., about 1.7 to 1.8 mm. The backplate part 77 has a key-shaped locking part 77a and a round support part 77b. The key-shaped locking part 77a is locked by the first and second housing members 52a and 52b. The round support part 77b is retractably supported by the first and second housing members 52a and 52b. The backplate part 77 is manufactured by molding and sintering a metallic powder containing copper and tin. The metallic powder used in the backplate part 77 has a copper (Cu) content of about 89%, a tin (Sn) content of about 9%, an iron (Fe) content of 1%, and a chromium (Cr) content of about 1%, with all percentage by weight.

The friction part 79 is made of a copper-based sintering alloy that has been integrally sintered with the backplate part 77 as a single, one-piece body with the backplate part containing copper and tin. The backplate part 77 and the friction part 79 are manufactured by molding and integrally sintering a metallic powder containing copper and tin. The friction part 79 has a thickness of, e.g., about 2.0 to 2.5 mm. The metallic powder of the friction part 79 has a copper (Cu) content of about 60%, a tin (Sn) content of about 2%, a zinc (Zn) content of about 7%, a nickel (Ni) content of about 6%, a chromium (Cr) content of about 3%, an iron (Fe) content of about 2%, a graphite content of about 10%, and an unspecified metal content of about 10%, with all percentage by weight.

Thus, even though the backplate part 77 and the friction part 79 are made of the same copper-based sintering alloy, changing the weight ratio of the iron and tin and increasing the proportion of tin in the backplate part 77 makes it possible to increase the high strength required for the backplate part 77, as well as the heat resistance and abrasion resistance required for the friction part 79.

The method for manufacturing the disk brake pad 76 shall be described hereunder.

First, two metallic powder mixtures having different mixing ratios are prepared for the backplate part 77 and the friction part 79. The mixing ratios are as stated previously. A mold defining a space for forming the brake pad 76 in the shape shown in FIGS. 6 and 7 is filled with the mixtures of metallic powder. In this filling step, first, the space in the mold used to form the friction part is filled with the mixture of metallic powder prepared for the friction part 79. The space in the mold used to form the backplate part is then filled with the mixture of metallic powder prepared for the backplate part 77. When the filling is completed, the space is closed off with a press mold, and the mold is placed in a hot press. In the hot press, the mixtures are pressed at a temperature of, e.g., 800° C. until sintered into the desired shape. The brake pad 76 is thereby formed with the friction part 79 and the backplate part 77 integrally formed therewith.

The steps for manufacturing the brake pad can be simplified and the cost of the brake pad reduced because the backplate part 77 and the friction part 79, which are made of a tin-containing copper-based sintering alloy, are integrally formed.

The sintering temperature can be lowered and the hardness of the friction part 79 reduced because the friction part does not need to be joined through diffusion bonding. Accordingly, even when the friction part 79 grips the disk rotor 22 during braking, no noise will be produced.

The entire brake pad 76 is molded into a compact; therefore, a backplate having a complex three-dimensional form can be readily manufactured, and function and design can be improved.

As shown in FIG. 1, the disk rotor 22 is fixed to the front wheel 17 and rotates in an associated movement with the wheel. As shown in FIG. 2, the disk rotor 22 is, e.g., a round plate member made of a stainless steel alloy, and is integrally formed with a hub attachment part 22a positioned centrally and a ring-shaped rotor part 22b to be used as a friction surface on the outer periphery.

Figure 4:
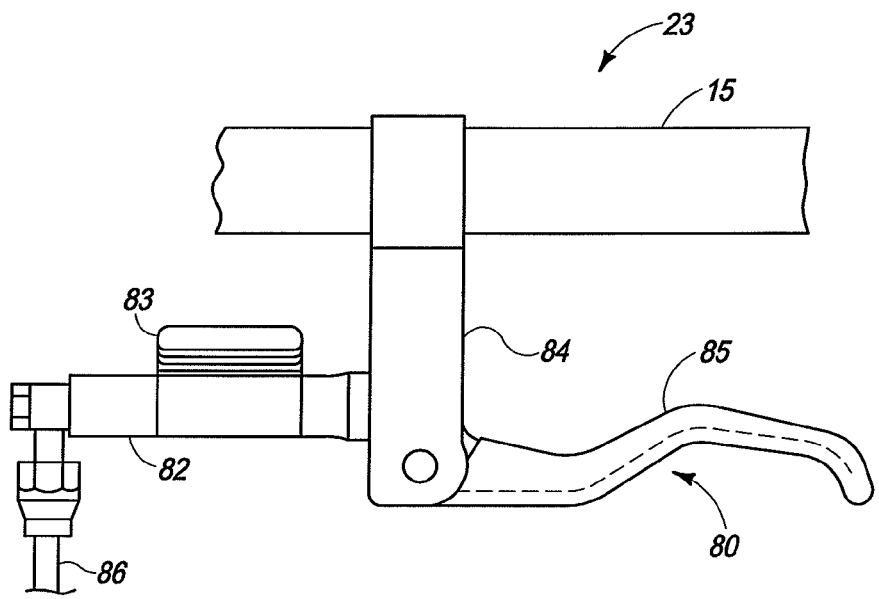
FIG. 4 is a front view of a brake actuating mechanism of the illustrated embodiment.

As shown in FIGS. 4 and 5, the brake actuating mechanism 23 brakes the front wheel 17 by moving the brake caliper 21 and forcefully gripping the disk rotor 22. The brake actuating mechanism 23 is attached as one body to the right edge part of the handlebar 15. The brake actuating mechanism 23 comprises a brake lever 80, a master cylinder 81, a master piston 82, and an oil tank 83.

As shown in FIGS. 4 and 5, the brake lever 80 comprises a bracket 84 that is mounted on the handlebar 15 and a lever part 85 that is mounted on the bracket 84 and is able to pivot between a braking position and a non-braking position. The bracket 84 is integrally formed with the master cylinder 81. The master piston 82 and the oil tank 83 are supported by the bracket 84. The master piston 82 is attached so as to be able to move within the master cylinder 81. More specifically, the oil tank 83 is attached to the master cylinder 81, communicates with the inside bore thereof, and supplies an actuating fluid thereto. The master piston 82 is connected to the lever part 85 on one end, and can accordingly be made to move in the axial direction within the master cylinder 81.

Therefore, when the lever part 85 is activated, the master piston 82 moves in the axial direction within the master cylinder 81. The master piston 82 thus moves within the master cylinder 81, whereby pressurized oil is sent to the hydraulic pipeline 86 connected to the brake caliper 21. Accordingly, the pressurized oil causes the pistons 74 and the brake pad 76 to move and grip the disk rotor 22, and the front wheel 17 is braked.

In the disk brake apparatus 12, the action of the brake actuating mechanism 23 causes the brake caliper 21 to move between a non-braking position, wherein the disk rotor 22 is able to rotate, and a braking position, wherein a braking force is applied to the disk rotor 22.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, a copper-based sintering alloy to which tin has been added is disclosed in the above embodiment. However, the present invention is not limited thereto. Also a friction member made of sintered metal with which forming and joining can be performed simultaneously is disclosed in the above embodiment. However, if able to be diffusion-bonded in sprayed layers, the friction member can be formed in advance. Dichromium trioxide, tin, a compound thereof, copper, and a compound thereof were given as examples of friction member materials in the above embodiment. However, the friction member materials are not limited thereto. Furthermore, the foregoing descriptions of the embodiments according to the present invention are provided for illustration only, and not for the purpose of limiting the invention as defined by the appended claims and their equivalents.

What is claimed is:

1. A disk brake pad for a bicycle comprising:
   a backplate part made of a copper-based sintering alloy with a first copper content by weight; and
   a friction part made of a copper-based sintering alloy with a second copper content by weight that is different from the first copper content, with the friction part being integrally sintered together with the backplate part as a single, one-piece body with the backplate part,
   the backplate part including a copper content of about 89%, a tin content of about 9%, an iron content of 1%, and a chromium content of about 1%, with all percentages by weight.

2. The disk brake pad for a bicycle according to claim 1, wherein
   the friction part includes a copper content of about 60%, a tin content of about 2%, an iron content of 2%, and a chromium content of about 3%, with all percentages by weight.

3. The disk brake pad for a bicycle according to claim 2, wherein
   the backplate part includes a copper content of about 89%, a tin content of about 9%, an iron content of 1%, and a chromium content of about 1%, with all percentages by weight.

4. A bicycle disk brake pad comprising:
   a backplate part made of a copper-based sintering alloy including a copper content of about 89%, a tin content of about 9%, an iron content of 1%, and a chromium content of about 1%, with all percentages by weight; and
   a friction part made of a copper-based sintering alloy that has been integrally sintered together with the backplate part as a single, one-piece body with the backplate part and the friction part containing copper and tin of different percentages by weight than those of the backplate part.

5. The disk brake pad for a bicycle according to claim 4, wherein the iron and tin of the backplate part as a different weight ratio than in the friction part.

6. The disk brake pad for a bicycle according to claim 5, wherein the backplate part has a greater proportion of the tin to the iron than in the friction part.

* * * * *